United States Patent [19]
Rogoff et al.

[11] Patent Number: 5,215,412
[45] Date of Patent: Jun. 1, 1993

[54] PNEUMATIC TRANSPORT SYSTEM

[76] Inventors: Eric A. Rogoff, 968 Wilamet Dr., Bethel Park, Pa. 15102; Philip A. Ignelzi, 143 Sharbot Dr., Pittsburgh, Pa. 15237; Daniel G. Farabaugh, 401 Rosecrest Dr., Monroeville, Pa. 15146

[21] Appl. No.: 774,898

[22] Filed: Oct. 11, 1991

[51] Int. Cl.⁵ .................... B65G 51/34; B65G 51/26; B65G 51/06; B65G 51/36
[52] U.S. Cl. ............................... 406/112; 406/148; 406/176; 406/179; 406/180; 406/185; 406/186; 406/147; 406/34
[58] Field of Search ........... 406/112, 111, 147–149, 406/176, 179, 31, 180, 34, 13, 186, 185

[56] References Cited

U.S. PATENT DOCUMENTS

| | | | |
|---|---|---|---|
| 627,181 | 6/1899 | Fordyce | 406/185 |
| 2,763,446 | 9/1956 | Hanson | 406/13 |
| 3,189,297 | 6/1965 | Ellithorpe | 406/111 |
| 3,305,192 | 2/1967 | Todt et al. | 406/111 X |
| 3,738,592 | 6/1973 | Smith et al. | 406/112 X |
| 4,135,684 | 1/1979 | Willey | 406/112 X |
| 4,352,603 | 10/1982 | Anders | 406/112 X |
| 5,131,792 | 7/1992 | Grosswiller et al. | 406/111 X |

FOREIGN PATENT DOCUMENTS

| | | | |
|---|---|---|---|
| 746766 | 11/1966 | Canada | 406/112 |
| 1139681 | 1/1969 | United Kingdom | 406/111 |

*Primary Examiner*—Russell D. Stormer
*Assistant Examiner*—James M. Kannofsky
*Attorney, Agent, or Firm*—Breiner & Breiner

[57] ABSTRACT

A pneumatic transport system, particularly useful as a mail transport system, which includes a transport carrier moving through a pneumatic tube line between remote sending/receiving stations is described. Movement of the transport carrier through the pneumatic tube line is by means of a positive or negative air flow in the tube line provided by a blower means. The air flow direction is controlled by utilizing a series of adjustable valves, such as butterfly valves. The system additionally employs sensors for indicating the presence of the carrier in the exterior station.

12 Claims, 3 Drawing Sheets

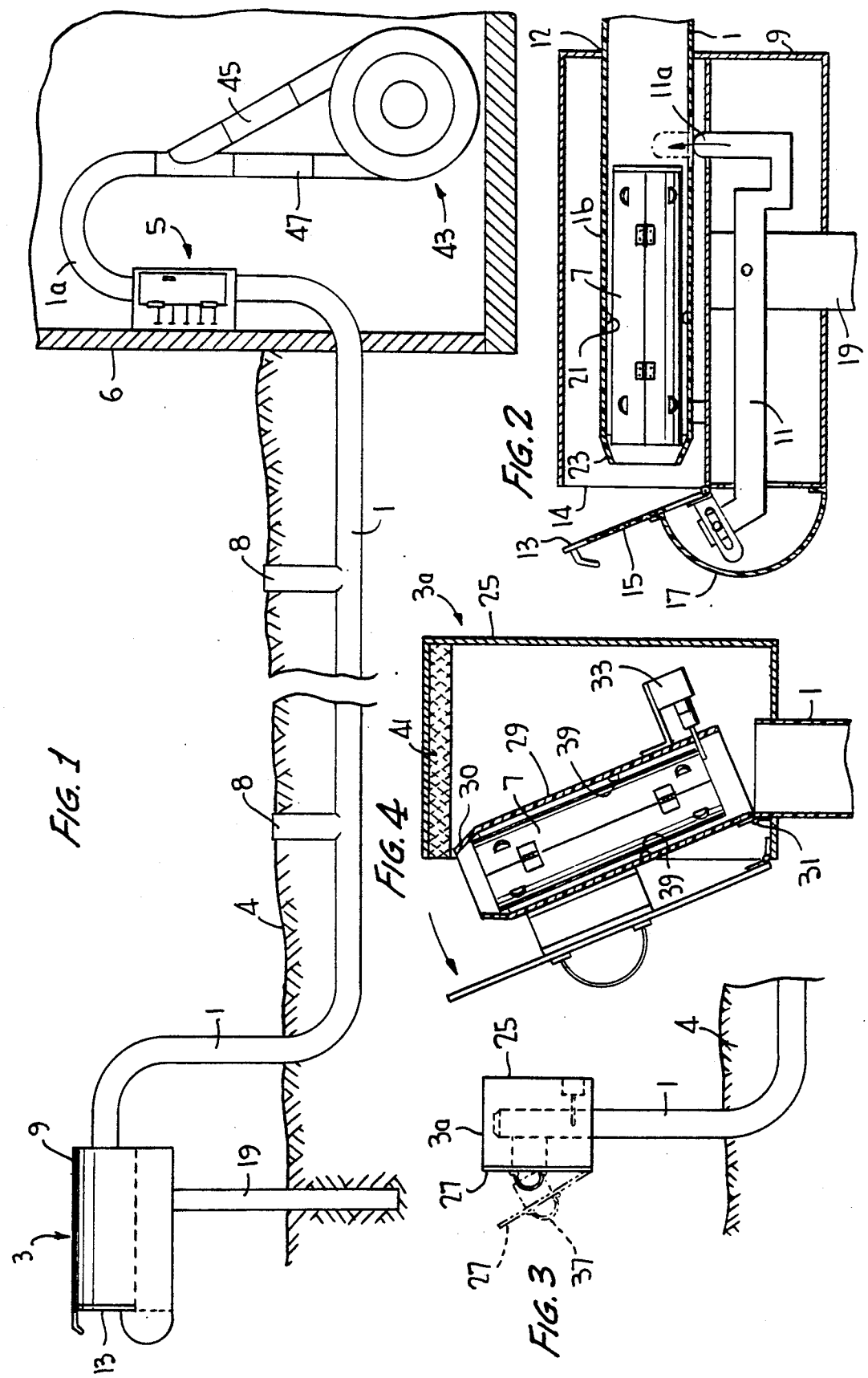

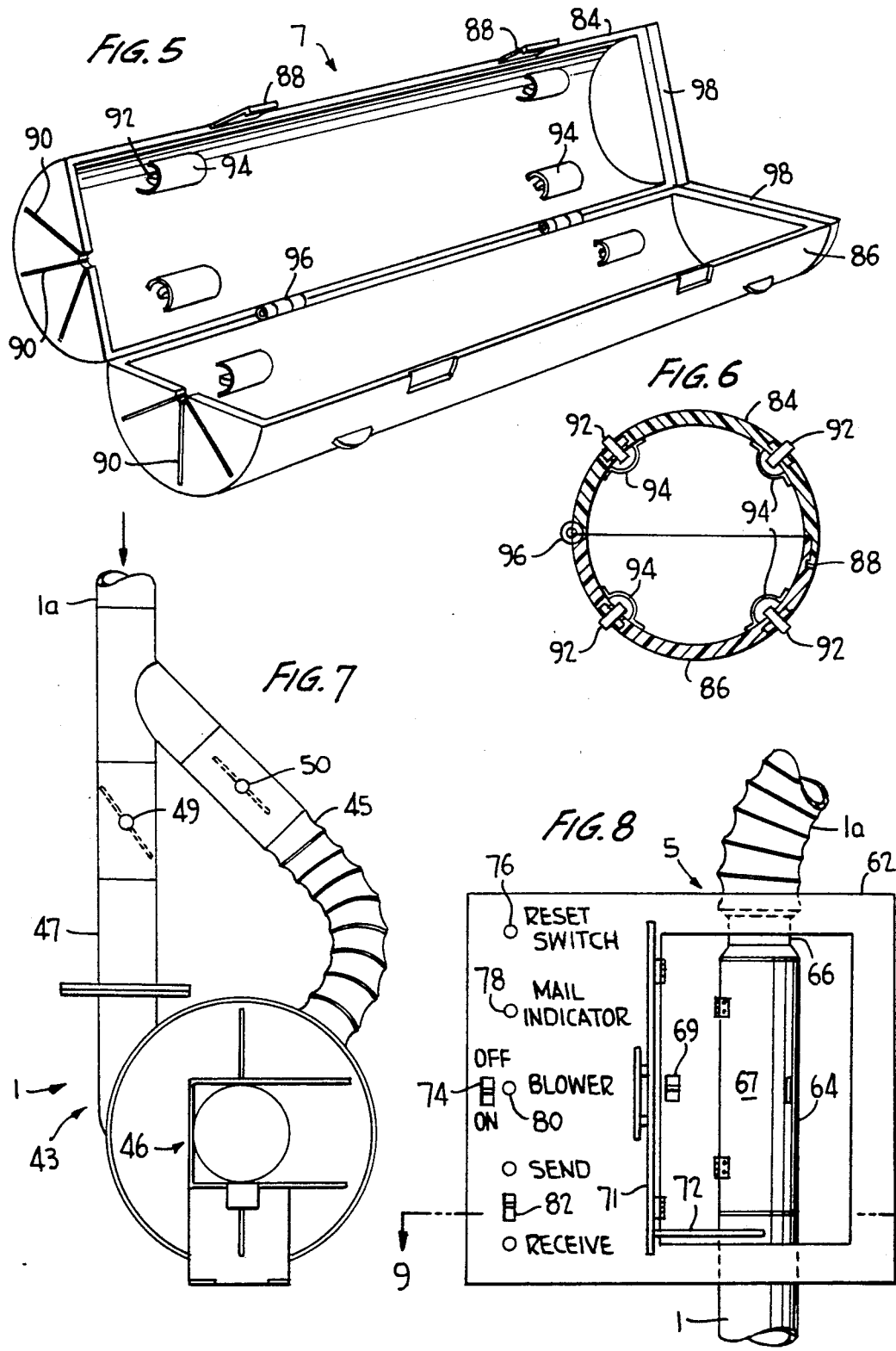

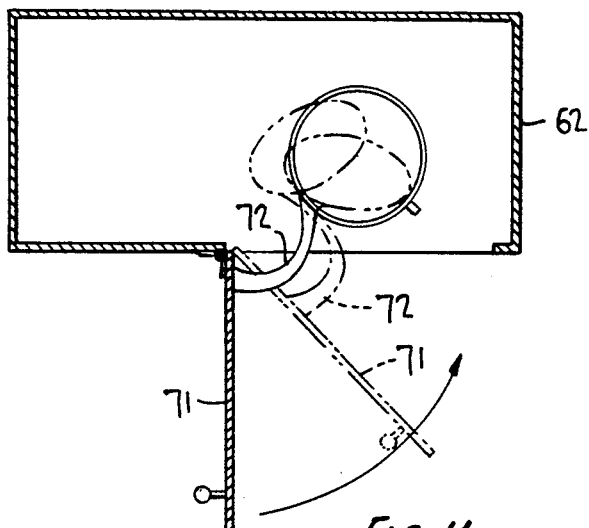
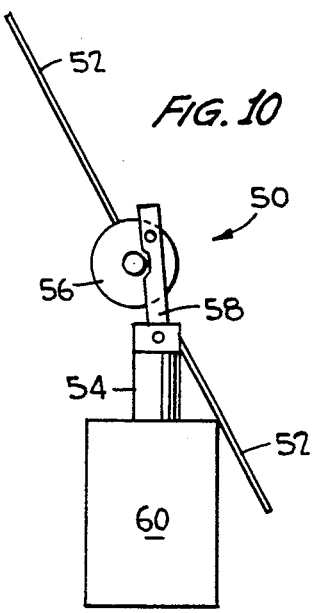
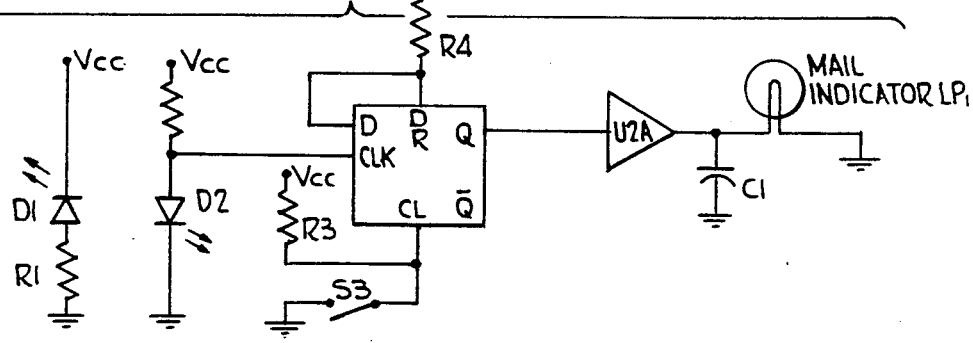
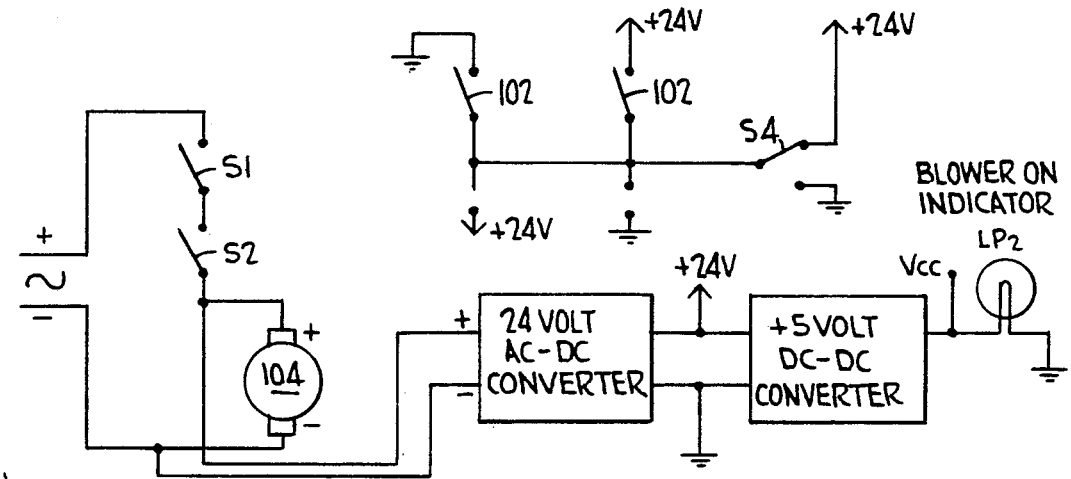

PNEUMATIC TRANSPORT SYSTEM

FIELD OF THE INVENTION

The present invention relates to a pneumatic transport system wherein a transport carrier is moved between remote sending/receiving stations through a pneumatic tube line by the use of a blower means. The system includes means to monitor and control the movement of the transport carrier within the system, as well as in the individual stations. The invention is particularly useful as a mail transport system wherein one station is located in the interior of a building and one station is located at an exterior point outside the building.

BACKGROUND OF THE INVENTION

The use of a pneumatic tube line for transporting articles between two remote points is known in the art. Varying specified means and structures are described in the art for the purpose of moving the transported articles between desired points.

For example, U.S. Pat. No. 3,556,437 describes a pneumatic tube line which extends between a sending station and a receiving station. An individual blower is located at each end of the tube line. The direction in which an article is to be transported through the tube line will control which blower will be activated to create an air flow within the line. An activation switch is present at each end of the tube line to operate the blower at that end of the tube. Following insertion of a transport carrier into the tube line at the desired station, the switch located in that station will be activated which in turn activates the blower to provide an air flow in the line to move the transport from the sending station to the receiving station. At the receiving station, the carrier shoots out of the tube line and lands on a pad contained in the station which is connected to a sensor.

U.S. Pat. No. 3,885,757 describes a pneumatic transportation system for transporting containerized cargos through pipelines. Compressed air is provided in the pipe line by an air compressor plant. Various specified devices are utilized along the line to control movement of articles into the line and within the line. For example, located along the pipeline is a carriage which provides for braking of the containers and for moving the containers into a loading and unloading chamber. Additionally, a pusher mechanism is located therein which is mounted in connection with a pumping plant powered by an electric motor for moving the containers.

The present invention provides a pneumatic transport system which operates utilizing a single blower means for controlling the transport of a carrier through a tube line in either direction between remote stations present along the tube line. Means to stop the motion of and contain the carrier in specified positions are an integral part of each station which operate automatically in response to the loading and unloading of a carrier in the stations. The receiving/sending stations are structured to operate with minimal operator action.

OBJECTS OF THE PRESENT INVENTION

Accordingly, a primary object of the present invention is to provide a pneumatic transport system having a pneumatic tube line through which a transport carrier is moved utilizing a single blower means.

A further primary object of the present invention is to provide a pneumatic transport system having remote sending/receiving stations which are activated and function with minimal operator action.

A further primary object of the present invention is to provide a pneumatic transport system having remote sending/receiving stations which are provided with means to substantially control and sense the movement of a transport carrier within the stations in response to loading and unloading the carrier in the stations.

A further primary object of the present invention is to provide a pneumatic transport system containing a blower means capable of controlling the air flow direction in the tube line through the use of a series of adjustable valves, preferably solenoid operated butterfly valves.

A further primary object of the present invention is to provide a mail transport system having an exterior sending/receiving station and an interior sending/receiving station, in particular which can be controlled solely from the interior station.

BRIEF DESCRIPTION OF THE INVENTION

The present invention is directed to a pneumatic transport system which includes remote sending/receiving stations, a pneumatic tube line, a blower means and a transport carrier capable of moving in the tube line and remote stations. The transport carrier is moved through the pneumatic tube line between the remote sending/receiving stations by means of an air flow provided by the blower means. The blower means provides an air flow which is capable of moving the transport carrier in either direction between the remote sending/receiving stations through the use of a series of adjustable valves, such as butterfly valves, positioned in the pipe lines connecting the blower means to the pneumatic tube line. The sending/receiving stations are provided with means for retaining the transport carrier therein when not in transit between stations. The system includes sensors for detecting the placement of mail or the like in the carrier in the remote station so that an operator can know when to transport the carrier to the other station. Control of the system components is possible through the interior station. The particular retaining means and sensors utilized will be determined by the manner of placement of the carrier within the station, i.e. horizontal or vertical.

BRIEF DESCRIPTION OF DRAWINGS

FIG. 1 is a schematic view of the pneumatic transport system of the present invention including an exterior sending/receiving station, an interior sending/receiving station, a blower means, and a pneumatic tube line.

FIG. 2 is a cross-sectional view of FIG. 1 showing a preferred embodiment of an exterior sending/receiving station containing a transport carrier in a horizontal position.

FIG. 3 is a side view of the exterior of an alternative embodiment of an exterior sending/receiving station of the transport system wherein the carrier when present therein is maintained in a vertical position.

FIG. 4 is a cross-sectional view of FIG. 3 of the alternative embodiment of the exterior sending/receiving station.

FIG. 5 is a perspective view of a preferred transport carrier when open which is useful in the transport system of the present invention.

FIG. 6 is a cross-sectional view of the transport carrier as shown in FIG. 5 when closed.

FIG. 7 is a partial view of the blower means used in the transport system of the invention which provides for the movement of a transport carrier within the transport system.

FIG. 8 is a front view of the interior sending/receiving station of the transport system of the present invention.

FIG. 9 is a cross-sectional view taken along line 9—9 of FIG. 8 of the interior sending/receiving station showing the retaining means present therein.

FIG. 10 is a side view of a preferred embodiment of a butterfly valve useful in the blower means of the present invention.

FIG. 11 schematically illustrates electronic circuitry suitable for use with the sensors of the system and an indicating means of the transport system for indicating the presence of the carrier in the exterior sending-/receiving station.

FIG. 12 schematically illustrates electronic circuitry suitable for use as the send/receive control mechanism for activating the blower means of the transport system of the present invention.

FIG. 13 schematically illustrates electronic circuitry suitable for use as blower activation/deactivation means for the transport system of the invention.

DESCRIPTION OF THE PRESENTLY PREFERRED EMBODIMENT

The present invention is directed to a pneumatic transport system having remote sending/receiving stations, a blower means, a pneumatic tube line, and a transport carrier capable of movement in the tube line and the sending/receiving stations. The transport system of the present invention is particularly useful as a mail transport system wherein one of the sending-/receiving stations is located in the interior of a building, one of the stations is located exteriorly of the building and the pneumatic tube line operatively connects the interior and exterior stations together. The transport system of the invention will be described herein in relation to such a mail transport system. The description, however, is not intended to limit the scope of the invention.

The pneumatic transport system of the invention as shown in FIG. 1 shows a preferred mail transport system. The system includes an interior sending/receiving station 5 located in a building 6 which is connected by a pneumatic tube line 1 to an exterior sending/receiving station 3. Pneumatic tube line 1 is preferably buried in the ground 4 so that it does not interfere with the surroundings. Tube line 1 preferably contains tube extensions 8 when tube line 1 is covered. Extensions 8 extend from tube line i to the ground surface so as to provide access means to tube line 1 in the event maintenance of tube line 1 is required. Extensions 8 will have a seal or the like at ground level so that tube line 1 is closed at these extensions. Tube line 1 also includes line portion 1a for connecting interior station 5 to a blower means 43. Blower means 43 includes pipe extensions 45 and 47 which are connected to line 1a. Blower means 43 is further described below.

Mail enters the transport system at exterior station 3. Exterior station 3 can have differing structures. A first preferred embodiment is shown in FIGS. 1 and 2 wherein the transport carrier 7 as utilized in the system is positioned horizontally within the exterior station 3. An alternative preferred embodiment is shown in FIGS. 3 and 4 wherein the transport carrier is positioned vertically within the exterior station 3a. The manner in which pneumatic tube line 1 is connected to the station is determined by which embodiment of the exterior station is utilized and thereby the position of the carrier within the station. Additionally, different retaining means can be utilized depending on the position of the carrier in the station. These and other features of the exterior stations are further described below.

Exterior sending/receiving station 3, as shown in FIGS. 1 and 2, includes an outer enclosure 9. Enclosure 9 is attached to a suitable support, such as post 19. Enclosure 9 includes an opening 12 through which an end 1b of tube line 1 extends, an opening 14 which is closed by door 13, and a flexible wall portion 17. Door 13 includes a screen or the like therein, the function of which is described below in relation to the operation of the system. One end of retaining arm 11 extends selectively into end portion 1b of tube line 1 and the other end is connected to the base of door 13. Retaining arm 11 is movably connected to door 13 so that movement of the door results in motion of retaining arm 11 as shown in FIG. 2. Flexible wall portion 17 is connected to door 13 and the base of enclosure 9 so as to allow free movement of door 13 while also shielding retaining arm 11 from exposure to the weather or other possible deteriorating or interfering elements. End portion 1b of tube line 1 preferably has a reduced opening 23. When transport carrier 7 is being transported to exterior station 3, reduced opening 23 prevents the carrier from exiting the tube line 1b. Other alternative bumper or stop means can be utilized which may or may not prevent removal of the carrier 7 from tube portion 1b. Retaining arm 11 is of a length such that upward extending portion 11a of arm 11 can extend into tube portion 1b at a point beyond the end of carrier 7 as shown in FIG. 2. When door 13 is opened, arm 11 is caused to move such that extension 11a moves upward thereby blocking any movement of carrier 7 into tube line 1. This prevents premature retraction of carrier 7 into tube line 1. When door 13 is closed, arm extension 11a is retracted downward. Tube portion 1b also contains therein sensors 21 which are preferably infrared sensors. The sensors detect the insertion of mail into the carrier in tube portion 1b and are operatively connected to the interior station 5 where an indicator means is present to relate this fact. The blower means 43 can then be activated to transport carrier 7 from exterior station 3 to interior station 5.

In the alternative embodiment of the exterior station 3a as shown in FIGS. 3 and 4, carrier 7 is positioned in a vertical position. Exterior station 3a includes an enclosure 25 which receives tube line 1 through the bottom wall of station 3a. Tube line 1 can be made using a material having sufficient strength for this purpose, such as rigid PVC tubing or steel-reinforced rubber hose. Enclosure 25 contains in one side wall a door 27 which is connected by a rigid connection means 35 or the like to a tubular member 29 which is of a suitable size to hold transport carrier 7 therein and be sealingly connected to the end of tube line 1 entering enclosure 25. Tubular member 29 is hingedly connected at 31 to tube line 1 and is of a complementary diameter to tube line 1. Preferably, a compression seal will be present at the point at which tube line 1 meets tubular member 29. Carrier 7 is held within tubular member 29 through the use of a retaining means 33 which is preferably a solenoid operated retaining arm. When door 27 is opened by means of handle 37 or the like, tubular member 29 containing transport carrier 7 is pulled forward providing access to carrier 7 so that mail can be inserted into carrier 7. Tubular member 29 additionally contains sensors 39 therein so that the presence of carrier 7 in member 29 can be detected in the same manner as in the first embodiment of exterior station 3 as described above. A screen member 41 is present in the top wall of enclosure 25, the function of which is further described below.

During use of the alternative embodiment of exterior sending/receiving station 3a as shown in FIGS. 3 and 4, carrier 7 is retained in tubular member 29 through means of retaining arm 33. Preferably, tubular member 29 has a reduced end portion 30 to control the upward motion of carrier 7 in tubular portion 29. Door 27 is pulled outward so that mail can be placed in carrier 7. Sensors 39 send a signal back to the interior sending/receiving station 5 which activates an indicator so that it can be known that mail has been placed in the exterior station. Upon closure of door 27, the system is in place for carrier 7 to be transported from exterior station 3a to interior station 5. Retaining arm 33 will be retracted when an appropriate switch has been activated at interior station 5, as further described below.

Exterior station 3 or 3a and blower means 43 are each operatively connected to interior sending/receiving station 5. Tube line 1 extends between and is connected to the exterior and interior stations. Tube portion 1a connects interior station 5 and blower means 43. A single blower means 43 is utilized to transport a carrier 7 between exterior station 3 o 3a and interior station 5 regardless of the direction in which carrier 7 is being transported. This is achieved through use of a series of adjustable valves, such as butterfly valves or the like, which are positioned in the air flow pipe lines 45 and 47 which are in turn connected to tube portion 1a.

The structure of the blower mechanism 46 itself within the blower means 43 is conventional in nature, as shown in FIG. 7. A high pressure blower mechanism is preferred. The output capacity of blower means 43 will depend upon the length, elevation differential, and the degree and number of horizontal/vertical curves in pneumatic tube line 1. The blower mechanism useful with the transport system will provide for an exhaust or outflow of air and the intake of air depending upon which direction the transport carrier 7 is to be directed in tube line 1.

Various structures of adjustable valves can be utilized to provide the function of adjustable valves 49 and 50. Preferred adjustable valves are butterfly valves and most preferably a solenoid butterfly valve as shown in FIG. 10. Butterfly valve 50 includes a pivot plate 52 which is suitably connected to a counter weight 56 which in turn is operatively connected to an arm 58 which is joined to a solenoid 60 by spring 54. When the high pressure blower means 43 is activated, the butterfly valves will open or close so as to provide the desired air flow direction, i.e. provide for the intake or exhaust of air with tube portion 1a and tube line 1 to thereby transport a carrier 7 in tube line 1.

More particularly, to transport a carrier 7 from exterior station 3 or 3a to interior station 5, the blower means 43 is activated to create a negative pressure in pneumatic tube line 1 which causes the atmospheric pressure to generate a pressure differential through screen 15 or screen 41 in the exterior station 3 or 3a, respectively, thereby forcing the transport carrier 7 to travel through the pneumatic tube line 1 to interior station 5. Whether butterfly valve 49 or 50 is closed or opened to determine the direction of air flow will depend upon which line 45 or 47 is set for providing air out flow, i.e. exhaust, or air intake. In either operation, one valve will be closed while the other valve will be open to thereby control the flow of air.

Interior sending/receiving station 5 includes a enclosure 62 which receives an end of tube line 1 from exterior station 3 or 3a and is connected to tube portion 1a which is connected to blower lines 45 and 47. Within enclosure 62 joining lines 1 and 1a is intermediate tube portion 64 into which transport carrier 7 will enter or be placed. Intermediate tube portion 64 has a reduced diameter section 66 at the top thereof. Section 66 prevents transport carrier 7 from entering line 1a and causes carrier 7 to stop within interior station 5. Intermediate portion 64 has a door 67 present therein for releasably sealing intermediate portion 64 and providing access to carrier 7 when present in tube portion 64. A blower shut-off switch 69 is present in enclosure 62 which operates in response to the movement of door 71 of enclosure 62. When door 71 is opened, switch 69 is released causing blower means 43 to shut off. Additionally, retaining plate 72 is attached to door 71 so that on opening of door 71, plate 72 is caused to block tube line 1 thereby preventing the transport carrier present in tube portion 64 from retracting into tube line 1 upon shut off of blower means 43. The operation of door 71 and plate 72 are shown in FIG. 9 wherein the movement of plate 72 is indicated as being positioned beneath the area in which the carrier will be present. Preferably, intermediate tube portion 64 is transparent so that the carrier 7 can be seen therein without the necessity of opening door 67.

As shown in FIG. 8, enclosure 62 has as part thereof a control panel including an on/off switch 74, a reset switch 76, a mail indicator 78, a blower activation switch 80, and a send/receive switch 82. The on/off switch controls the receipt of power to the entire system.

When mail has been placed in exterior station 3 or 3a, as described above, the mail is ready to be transported. The send/receive switch 82, which is preferably a toggle switch, is switched to the receive position which activates butterfly valves 49 and 50 to provide the proper air flow direction. The high pressure blower means 43 is then activated by blower switch 80. As described above, the blower means 43 then creates a negative pressure in the pneumatic tube line 1 which causes the atmospheric pressure to generate a pressure differential through the screen 15 or 41 of exterior station 3 or 3a, respectively. This pressure differential forces the transport carrier 7 through the pneumatic tube line 1 until it reaches interior station 5.

Upon arriving at interior station 5, the transport carrier will be stopped in tube portion 64 by reduced portion 66. Door 71 of enclosure 62 of interior station 5 is opened thereby causing the blower means 43 to be deactivated due to release of shutoff switch 69 and further causing safety retainer plate 72 to swing in and block pneumatic tube line 1 preventing the transport carrier 7 from retracting into tube line 1. Door 67 in intermediate tube portion 64 is then opened and transport carrier 7 removed from tubular portion 64. The mail placed in transport carrier 7 can then be taken from the carrier.

To return carrier 7 to the exterior station 3 or 3a from interior station 5, reset switch 76 is actuated reset the mail indicator signal 78 and sensors 21 or 39 contained in exterior station 3 or 3a, respectively.

Thereafter, the transport carrier 7 is placed back in tube portion 64 of station 5. Door 67 is closed followed by the closing of door 71. Upon the closing of door 71, safety retaining plate 72 is retracted. The send/receive switch 82 is placed in the send mode thereby energizing the valves 49 and 50 of the blower means to change the direction of the air flow. Blower means 43 is then activated by switch 80 to establish a positive pressure in pneumatic tube line 1 which serves to displace the transport carrier 7 from interior station 5 to exterior receiving station 3 or 3a. When exterior receiving station 3a is utilized, transport carrier 7 enters enclosure 25 which triggers the retaining sensor 39 which in turn activates the solenoid retaining arm 33 to extend and prevent the carrier from retracting into tube line 1. When exterior station 3 is utilized, the transport carrier 7 will be in a horizontal position and, accordingly, the transport carrier will not retract and, therefore, the use of a retaining arm at this point is not required.

A preferred transport carrier for use in the system of the present invention is best shown in FIGS. 5 and 6. Transport carrier 7 is preferably a cylindrically-shaped member which is complementary in shape but smaller in diameter than the interior of pneumatic tube line 1. The carrier is preferably formed from two hingedly connected halves 84 and 86. Halves 84 and 86 are held together in a closed position, as shown in FIG. 6, by means of one or more latches 88. One end of transport carrier 7 can have slots 90 formed therein through which mail or the like can be inserted into transport carrier without the necessity of opening transport carrier 7 Reduced end portion 23 or 30 as utilized at the end of tube line 1 in exterior stations 3 or 3a will be required to be expansible so that carrier 7 can be removed from the exterior station so that the carrier can be opened and the sensors activated to indicate receipt of mail. The end opposite that of the slotted end of carrier 7 will preferably have a recoil pad 98, such as solid plastic neoprene, attached thereto for activating the sensors 21 or 39 which in turn illuminate the mail indicator signal 78 in interior station 5.

Additionally, transport carrier 7 can preferably have a plurality of wheels 92 in relation to the outer walls of carrier 7. Wheels 92 preferably extend through the walls forming halves 84 and 86. The interior of carrier 7 at the point that wheels 92 penetrate the walls of halves 84 and 86 will have cover members 94 so that movement of the wheels will not interfere or be interfered with by an article contained in carrier 7. Wheels 92 aid the ability of transport carrier 7 to move smoothly within pneumatic tube line 1.

When mail has been placed in transport carrier 7 and carrier 7 received by interior station 5, the mail is removed from carrier 7 by unfastening latches 88 and rotating the two halves 84 and 86 about hinges 96. Thereafter, the carrier is ready to be returned to the exterior station 3 or 3a.

FIG. 11 sets forth a mail detection circuit which can be utilized to provide connection between the sensors 21 or 39 of exterior stations 3 or 3a, respectively, and the mail indicator 78 and reset switch 76 of interior station 5.

FIG. 11 illustrates electronic circuitry suitable for use with an exterior sending/receiving station 3 as shown in FIGS. 1 and 2. D1 refers to the infrared emitter of the sensor 21 or 39 and D2 refers to the infrared detector. R1 is 100 ohm, R2 is 1500 ohm, R3 4700 ohm, and R4 4700 ohm. S3 refers to the reset switch 76. For using alternative embodiment exterior station 3a, a retaining infrared sensor will be added to the circuitry for controlling retaining arm 33.

FIG. 12 sets forth an example Of suitable electronic circuitry for the operation of the send/receive switch 82 of interior station 5. The number 100 refers to the receive solenoid, the number 102 to the control solenoids, and S4 refers to the send/receive switch 82.

FIG. 13 sets forth an example of suitable electronic circuitry for control of the blower means 43. S1 refers to the on/off switch 74, S2 refers to the blower switch 80, 104 refers to the blower means 43, and LP2 refers to the blower on indicator as shown.

As will be apparent to one skilled in the art, various modifications can be made within the scope of the aforesaid description. Such modifications being within the ability of one skilled in the art form a part of the present invention and are embraced by the appended claims.

It is claimed:

1. A pneumatic transport system comprising a first sending/receiving station; a second sending/receiving station; a blower means having an intake air flow line and an exhaust air flow line, each of said air flow lines containing an adjustable directional flow valve so that said blower means selectively provides a positive air flow or a negative air flow; a pneumatic tube line extending between and connected to said first sending/receiving station and said second sending/receiving station and extending between and connected to said second sending/receiving station and said intake and said exhaust air flow lines connected to said blower; and a transport carrier capable of moving in said pneumatic tube line between said first and said second sending/receiving stations and entering said first and said second sending/receiving stations wherein said first sending/receiving station comprises an enclosure having an access means to said atmosphere outside said enclosure, an open-ended circular tubular member capable of holding said transport carrier within said enclosure, a retaining means which selectively operates in connection with said tubular member to retain said transport carrier in said tubular member, and a sensor means for indicating the presence of said transport carrier in said tubular member, and wherein said second sending/receiving station comprise an enclosure with a sealable access opening therein, a tubular means extending through said enclosure and connected to said pneumatic tube line extending between and connected to said first and said second sending/receiving stations and to said pneumatic tube line extending between and connected to said second sending/receiving station and said blower means, a retaining arm connected so as to operate upon sealing or unsealing of said sealable access opening to retain or release the carrier in said second sending/receiving station, a blower control means, a blower deactivation means, a send/receive activation means, and an indicator means operatively connected to said first sending/receiving station to indicate the presence of said transport carrier in said first station.

2. A pneumatic transport system according to claim 1 wherein said directional flow valves are butterfly valves.

3. A pneumatic transport system according to claim 1 wherein said transport carrier is a cylindrical member formed of first and second hingedly connected halves and wheel means connected to each side wall of said first and said second halves.

4. A pneumatic transport system comprising a first sending/receiving station; a second sending/receiving station; a blower means; a pneumatic tube line extending between and connected to said first sending/receiving station and said second sending/receiving station and extending between and connected to said second sending/receiving station and said blower means; and a transport carrier capable of moving in said pneumatic tube line between said first and said second sending/receiving stations and entering said first and second sending/receiving wherein said second sending/receiving station is an interior station and comprises an enclosure with a sealable access opening therein, a tubular means extending through said enclosure and connected to said pneumatic tube lien extending between and connected to said first and said second sending/receiving stations and to said pneumatic tube line extending between and connected to said second sending/receiving station and said blower means, a retaining arm connected to operate upon sealing or unsealing of said sealable access opening to retain or release the carrier in the interior station, a blower control means, a blower deactivation means, a send/receive activation means, and an indicator means operatively connected to said first sending/receiving station to indicate following a predetermined movement of the carrier the presence of said transport carrier in said first station.

5. A pneumatic transport system according to claim 4 wherein said blower deactivation means is operatively connected to operate in response to the unsealing of said sealable access opening in said enclosure.

6. A pneumatic transport system according to claim 4 wherein said transport carrier is a cylindrical member formed of first and second hingedly connected halves and wheel means connected to each side wall of said first and said second halves.

7. A pneumatic transport system comprising a first sending/receiving station; a second sending/receiving station; a blower means; a pneumatic tube line extending between and connected to said first sending/receiving station and said second sending/receiving station and extending between and connected to said second sending/receiving station and said blower means; and a transport carrier capable of moving in said pneumatic tube line between said first and said second sending/receiving stations and entering said first and second sending/receiving stations, wherein said first sending/receiving station comprises an enclosure having an access means to said atmosphere outside said enclosure, an open-ended circular tubular member capable of holding said transport carrier within said enclosure, a retaining means which selectively operates in conjunction with said tubular member to retain said transport carrier in said tubular member, and a sensor means for indicating the presence of said transport carrier in said tubular member following a predetermined movement of the carrier, wherein said tubular member is integral with said pneumatic tube line and said retaining means is operatively connected to respond to movement of said door means of said enclosure.

8. A pneumatic transport system according to claim 7 wherein said sensor means is operatively connected to said second sending/receiving station.

9. A pneumatic transport system according to claim 7 wherein said transport carrier is a cylindrical member formed of first and second hingedly connected halves and wheel means connected to each side wall of said first and said second halves.

10. A pneumatic transport system comprising a first sending/receiving station; a second sending/receiving station; a blower means; a pneumatic tube line extending between and connected to said first sending/receiving station and said second sending/receiving station and extending between and connected to said second sending/receiving station and said blower means; and a transport carrier capable of moving in said pneumatic tube line between said first and said second sending/receiving stations and entering said first and said second sending/receiving stations, wherein said first sending/receiving station comprises an enclosure having an access means to said atmosphere by said enclosure, an open-ended circular tubular member capable of holding said transport carrier within said enclosure, a retaining means which selectively operates in conjunction with said tubular member to retain said transport carrier in said tubular member, and a sensor means for indicating the presence of said transport carrier in said tubular member following a predetermined movement of the carrier, wherein said tubular member is a separate member hingedly connected to said pneumatic tube line and attached to a closure means for said enclosure.

11. A pneumatic transport system according to claim 10 wherein said retaining means is operatively connected to respond to the energization of circuit connected to said second sending/receiving station.

12. A pneumatic transport system according to claim 10 wherein said sensor means is operatively connected to said second sending/receiving station.

* * * * *